United States Patent [19]

Bartesch et al.

[11] Patent Number: 4,681,029

[45] Date of Patent: Jul. 21, 1987

[54] APPARATUS FOR TREATING SOYBEANS

[75] Inventors: Helmut Bartesch, Ravensburg; Gerd Florin, Vorberg, both of Fed. Rep. of Germany

[73] Assignee: Sulzer-Escher Wyss Limited, Zürich, Switzerland

[21] Appl. No.: 792,129

[22] Filed: Oct. 28, 1985

Related U.S. Application Data

[63] Continuation-in-part of Ser. No. 312,660, Oct. 19, 1981, Pat. No. 4,556,573.

[30] Foreign Application Priority Data

Nov. 4, 1980 [CH] Switzerland ........................ 8186/80

[51] Int. Cl.[4] ................................................ A23L 1/20

[52] U.S. Cl. ........................................ 99/483; 99/516; 99/518

[58] Field of Search ................. 99/483, 516, 518, 519, 99/520, 524, 584, 609–612; 426/467, 482, 483, 430, 466, 486; 241/7, 185 R, 186 R; 34/57 A, 57 R

[56] References Cited

U.S. PATENT DOCUMENTS

| | | | |
|---|---|---|---|
| 3,220,451 | 11/1965 | Bollens et al. | 426/482 |
| 3,630,754 | 12/1971 | Wayne | 426/482 X |
| 3,703,200 | 11/1972 | Palyi et al. | 426/483 |
| 3,981,234 | 9/1976 | Nelson et al. | 99/518 X |
| 4,508,029 | 4/1985 | Malone | 99/483 X |

FOREIGN PATENT DOCUMENTS

| | | | |
|---|---|---|---|
| 2339908 | 3/1975 | Fed. Rep. of Germany | 426/486 |
| 814756 | 6/1959 | United Kingdom | 426/466 |

*Primary Examiner*—Timothy F. Simone

*Attorney, Agent, or Firm*—Werner W. Kleeman

[57] ABSTRACT

During processing the soybeans are heated-up in a first of two successively arranged fluidized beds with a rapidity such that the hulls loosen or detach from the seeds and there is obtained a honogeneous heating of all of the soybeans. The heated-up soybeans may be directly conveyed into the second fludized bed where they are maintained in a heated condition and from which location they are infed in a heated state to a breaking or cracking mill where they are crushed or cracked and then to a flaking device for the subsequent flaking thereof. It is also possible to undertake along the conveying path from the first fluidized bed to the second fluidized bed a mechanical dehulling operation at the soybeans where the hulls are separated from the seeds and the seed portions are delivered into the second fluidized bed. At that location, the seed portions are maintained in a heated condition and then they are delivered in a heated state to the breaking or cracking mill where they are crushed or cracked and then to the flaking device where they are subsequently flaked. Processing is accomplished continuously and the material is only heated-up one time.

16 Claims, 3 Drawing Figures

APPARATUS FOR TREATING SOYBEANS

CROSS REFERENCE TO RELATED APPLICATION

This application is a continuation-in-part application of our commonly assigned, copending U.S. application Ser. No. 06/312,660, filed Oct. 19, 1981, and entitled "Method For Treating Soybeans", now U.S. Pat. No. 4,556,573, granted Dec. 3, 1985.

BACKGROUND OF THE INVENTION

The present invention relates to a new and improved apparatus and method for the processing of soybeans, wherein the soybeans are subjected to a breaking or cracking action in order to be flaked prior to extraction in a method for the recovery of soybean oil and soybean meal.

Soybeans possess a lecithin-containing oil in an amount of approximately 20% and protein in an amount of approximately 36%. During the processing of the soybeans there is accomplished the separation, resulting in recovery of the oil and the extracted material is used as feed or fodder. The extraction typically is accomplished through the use of a solvent. At the present time there are fabricated two types of meal, a so-called normal meal having a protein content of approximately 44% and a high-grade meal whose protein content is in the order of approximately between 49 to 50%. In the case of the high-grade meal there is obtained an increase in the protein content by separating the soybean hulls or shells which predominantly contain fibers and other ballast materials.

With a present day conventional method, the soybeans are heated to approximately 90° C. in a shaft drier-cooler and subsequently cooled in the cooler to a temperature of approximately 10° C. above the ambient temperature. The purpose of this process step, resulting in a reduction in the moisture content of approximately 2 percent-by-weight, is to render the hulls brittle, cause them to split or burst and to detach from the actual seeds or kernels of the soybeans. However, in order to obtain a satisfactory separation or dehulling it is necessary to temper all of the soybeans for at least 48 hours prior to further processing. This is accomplished in temper silos or bins which constitute large size and expensive structures. After the tempering operation the entire lot of soybeans is crushed or cracked by means of two-stage corrugated roll beds or mills while in a cold condition for the purpose of freeing the hull or shell portions and the seed portions or kernels. The cracked material is separated by means of vibration sieves into seed portions and hulls or shells. The hulls are removed by a suction action in accordance with the vacuum cleaner principle. This suct fraction, however, still contains much too great an amount of protein and oil-containing seed particles and therefore additionally must be separated in two further stages into hulls and seed portions. The material cleaned from the hulls or shells is subsequently conditioned. To that end the product temperature is again elevated to approximately 60°-65° C., so that there is lowered the viscosity of the oil encapsulated in cells and the previously hard soybean fractures become plastic in order that at the subsequent flaking roll bed the fractured pieces can be rolled with the least possible expenditure in energy, into stable thin flakes of approximately 0.3 mm thickness.

The just-described conventional method appears to be uneconomical for a number of different reasons. On the one hand, the material is heated-up, thereafter, however, immediately cooled and fractured or cracked in a cold condition at the corrugated rolls or rollers. These operations expose the equipment to considerable mechanical loads which, in turn, impairs its service life, and following the cracking or fracturing operation the material is again heated to approximately 65° C. Hence, an appreciable amount of work and energy is associated with the practice of this prior art method. Furthermore, this method if discontinuous by virtue of the necessity of storing the soybeans in tempering silos. As mentioned, these tempering silos are large and expensive structures.

SUMMARY OF THE INVENTION

Therefore, with the foregoing in mind, it is a primary object of the present invention to provide a new and improved apparatus for and method of processing soybeans in a manner not afflicted with the aforementioned drawbacks and limitations of the prior art proposals.

Another and more specific object of the present invention aims at providing an improved method and apparatus for processing soybeans in a more economical fashion.

Still a further significant object is directed to an improved method of and apparatus for processing soybeans which is carried out continuously and renders superfluous the use of expensive and complicated structures.

Still a further significant object is directed to devising a novel method of and apparatus for processing soybeans in an economical fashion resulting in a predominant savings in energy.

Yet a further important object of the invention is directed to a new and improved method of and apparatus for processing soybeans, with less mechanical loading of the employed rolling mills or beds, so that their service life is prolonged.

Now in order to implement these and still further objects of the invention, which will become more readily apparent as the description proceeds, the method of processing soybeans as contemplated by the invention is manifested by the features that the soybeans are heated-up in a first of two successively or tandemly arranged fluidized beds with a rapidity such that there is accomplished loosening or detachment of the hulls from the seeds or kernels and there is realized a substantially homogeneous heating-up of all of the soybeans. The heated-up soybeans are then either directly introduced into the second fluidized bed where they are maintained in a heated condition and from which, in their heated condition, they are delivered for breaking or crushing or cracking and subsequent flaking, or else along the path of the material from the first fluidized bed to the second bed the hulls are dehulled or separated from the seeds and the seeds or seed portions are introduced into the second fluidized bed where they are maintained in a heated condition and from which location they are then conducted, in their heated condition, to a site where they are crushed or broken or cracked and then subsequently flaked. Savings in energy are advantageously realized in that the material to be processed is only brought one time, and specifically, at the location of the fluidized beds to the higher stage of the thermal treatment. The inventive method is accomplished continuously, there is dispensed with the need for expensive silos and the mechanical loading of the equipment employed for the crushing or breaking or cracking operation is reduced since the processing, the crushing or cracking operation, is carried out in a heated condition of the soybeans.

As to the apparatus aspects of the present development, the same contemplates providing an apparatus for the continuous preparatory treatment of soybeans in order to recover soybean oil and soybean meal, which comprises a fluidized bed for applying to the soybeans composed of hulls and seeds contained in such hulls a substantially homogeneous heat treatment for a relatively brief amount of time insufficient for substantial heat diffusion to the seeds, so as to essentially apply heat only to the hulls and the outer surface of the seeds, in order to render the hulls brittle and to cause them to loosen from the seeds. A corrugated roll mill is arranged after the fluidized bed, and means serve for feeding the substantially homogeneously heat treated soybeans from the fluidized bed to the corrugated roll mill without any intermediate cooling thereof. The corrugated roll mill subjects the substantially homogeneously heat treated soybeans while in a heated condition to shearing forces in order to crack or split the soybeans, so that there are substantially formed split seeds and split hulls. A separate impacting device is arranged after the corrugated roll mill and there are provided means for delivering soybeans from the corrugated roll mill without any intermediate cooling to the separate impacting device where the split soybeans composed of the split seeds and split hulls are subjected to an impacting action in order to separate a predominant part of the split hulls from their related split seeds.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
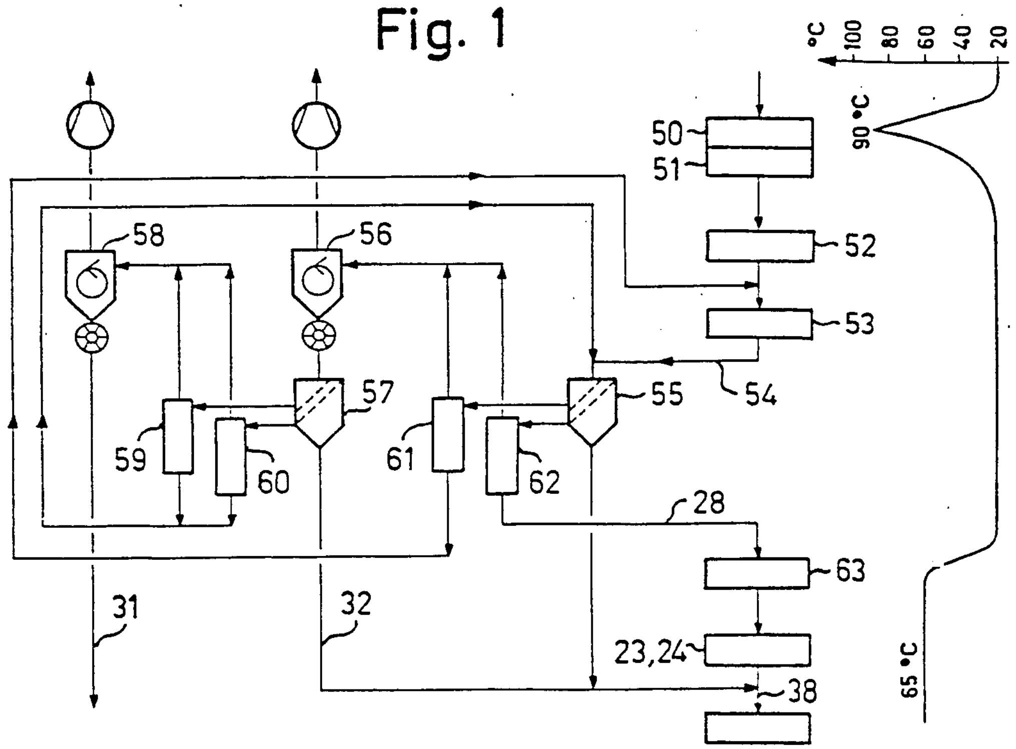
FIG. 1 schematically illustrates an installation for performing the previously described prior art method.

Directing attention now to the drawings, in FIG. 1 there is illustrated a prior art construction of installation used heretofore in the conventional treatment of soybeans in accordance with the description presented at the outset of this disclosure. Reference will again be made to the prior art equipment of FIG. 1 during the course of the discussion of the inventive method, to be described in conjunction with FIGS. 2 and 3, and the illustration of FIG. 1 therefore is helpful in providing background information and for highlighting some of the more important aspects and advantages which can be realized when practicing the inventive method.

Figure 2:
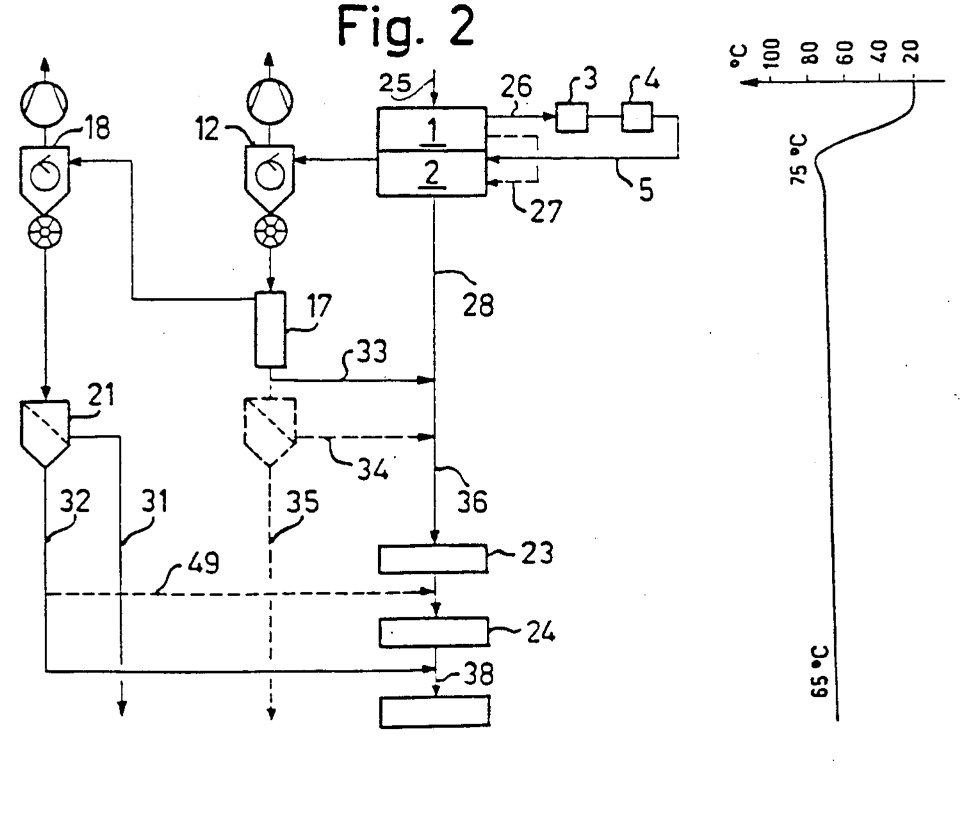
FIG. 2 schematically illustrates an installation for the performance of the inventive method of processing soybeans.
Figure 3:
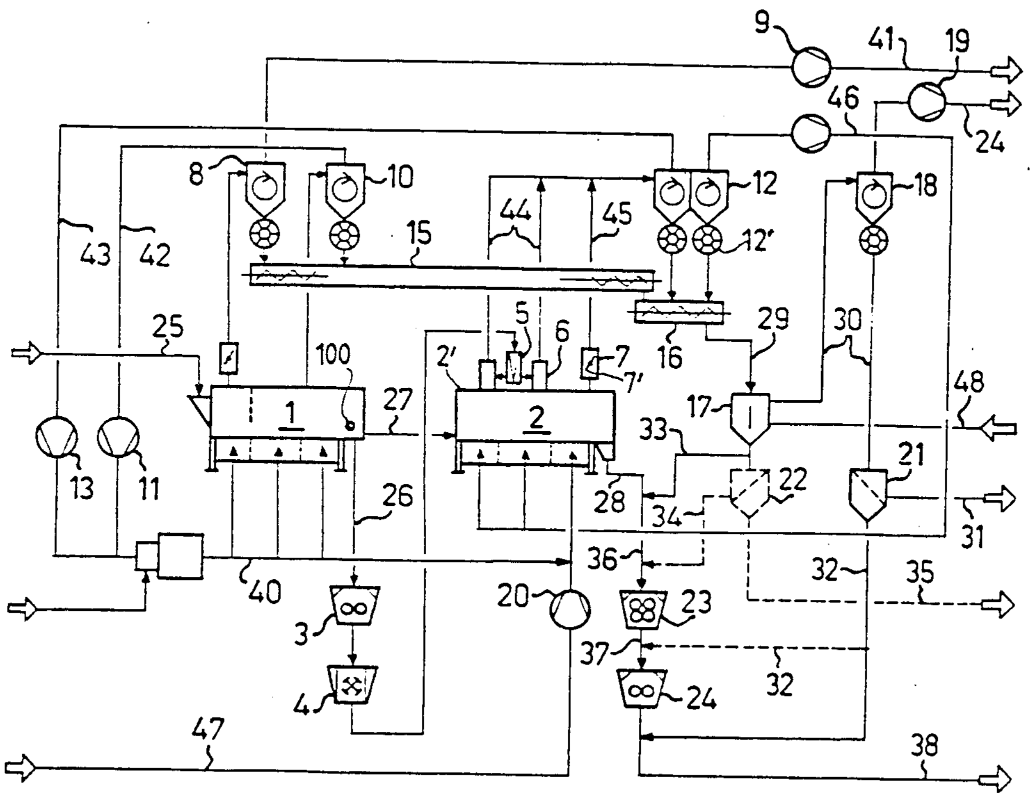
FIG. 3 schematically illustrates an advantageous further construction of installation for the performance of the inventive soybean processing method.

Turning attention now to FIGS. 2 and 3 there have been respectively illustrated therein exemplary embodiments of the equipment useful for the practice of the inventive method. It will be understood that the soybeans which are to be processed are introduced by means of a conduit or line 25 or equivalent structure into a first fluidized bed 1 following which there is arranged a further or second fluidized bed 2 constituting a conditioner. Both of the fluidized beds 1 and 2 are arranged in succession or in tandem. In the first fluidized bed 1 the soybeans are rapidly heated-up and may be directly infed to the second fluidized bed 2. The first fluidized bed 1 may have its floor slightly inclined, for instance may possess an inclination amounting at a maximum to about 3%. Moreover, of the fluidized beds 1 and 2 may be equipped with nozzles serving for preventing deposition of dust or other impurities on the floor of the related fluidized bed and any undesired plugging or clogging of such fluidized bed, for instance as disclosed in the commonly assigned U.S. Pat. No. 4,371,115, granted Feb. 1, 1983, or the commonly assigned U.S. application Ser. No. 746,007, filed June 19, 1985, to which reference may be readily had and the disclosure of which is enclosed herein by reference. The first fluidized bed 1 may be also advantageously provided at its outfeed end with a worm, as generally indicated by reference character 100 in FIG. 3, for the removal of undesired heavy particles or contaminants, such as stones. This worm 100 may have a progressive pitch.

Both of the fluidized beds 1 and 2 have been shown separated from one another in the schematic illustration of FIG. 2, but however, and this is usually the case, such also may be assembled together into a structural unit or apparatus separated by intermediate walls. In the second fluidized bed 2 the soybeans are maintained in a heated or elevated condition and subsequently they are conveyed by means of the conduit or line 28 to a roller bed or mill 23 where they undergo a crushing or breaking or cracking operation. With this method, where the entire non-dehulled soybeans are processed, there is produced after the subsequent flaking which is performed at the flaking apparatus 24 and the accomplished extraction in the extractor to which the line 38 leads from the flaking apparatus, the so-called normal meal having a protein content of approximately 44% since there is contained therein the soybean hulls.

With the illustrated installations of FIGS. 2 and 3 it is also possible however to produce high-grade meal having a protein content of approximately 49–50%.

The soybeans are heated in the first fluidized bed 1 to, for instance, approximately in a range of 75° C. to 90° C. by hot air which is at a temperature in the order of 165°–170° C. The residence time of the material in the fluidized bed 1 amounts to approximately six minutes or less depending upon the product throughput. Due to this residence time there does not occur any appreciable diffusion, so that the infed soybeans, when processing dry soybeans, have removed therefrom at the most about 0.5% moisture content. This is extremely desirable in consideration of the mass balance. It has been found that this rapid heating-up of the soybeans is adequate in order to simultaneously render the shells or hulls brittle and to cause them to loosen or detach from the seeds or kernels. All of the introduced soybeans are thus homogeneously heated-up.

The heated-up soybeans are delivered from the fluidized bed 1, by means of a line or conduit 26, to a single-stage corrugated roll mill or bed 3 and from that location to a subsequently arranged impacting device 4, such as a hammer or hammer-type mill 4. Suitable constructions of impacting devices have also been disclosed in our commonly assigned, co-pending U.S. application Ser. No. 06/660,981, filed Oct. 15, 1984, to which reference may be had and the disclosure of which is incorporated herein by reference. At these two mills 3 and 4, the seeds or kernels along with the detached hulls or shells are mechanically comminuted, which constitutes a first step towards separation of the hulls or shells from the seeds or kernels. By suitably selecting the roll nip or gap and the corrugations or surface configuration of the rolls and also the impact plate or sieve of the hammer-type mill 4, the soybeans are divided into halves or even further portions, such as quarters, in such processing stage. At the same time the previously thermally loosened or detached hulls or shells are removed or dehulled and freely exposed or laid open. Additionally, there is exposed or laid open the soybean buds or sprouts. The thus processed material is now introduced into the second fluidized bed 2 opposite to the direction of flow of the exhaust air current or stream effluxing from the second fluidized bed 2, and specifically in a manner such that the shells or hulls are withdrawn along with the exhaust air.

Guiding of the material opposite to the exhaust air current or stream is accomplished by means of a distributor regulator 5 or equivalent structure from where it is introduced into a plurality of sifting or sieve channels 6 provided at the hood 2' of the fluidized bed 2, as has been particularly shown in FIG. 3.

A suitable apparatus for the uniform distribution of the material which is to be introduced into the exhaust air stream or current also could be realized through the provision of exhaust air pipes or conduits structured as sieves or sifters and leading to the hood 2' of the fluidized bed 2.

By suitably selecting the sieving or sifting velocity, in other words the velocity of the exhaust air flow or stream, which can be regulated in a simple fashion by a throttle valve 7' provided in the exhaust air connection 7 from which exhaust line 45 leads to the cyclone device 12, it is possible to separate both the hulls or shells and also with extreme sifting hulls and buds or sprouts. In the last-mentioned case at the hull or shell side there appears a mixture of hulls or shells, granular fractures, buds and meal in the order of about 15% of the throughput A. This value can be lowered to at least 10% if there is relinquished recovery of the buds or sprouts.

This value, however, simultaneously also means that the further separation of the hulls or shells and the material which is to be recovered is to be conceived for only 15% of the installation throughput.

From what has been heretofore described there is located in the fluidized bed 2 the seed or kernel halves and possibly the buds or sprouts. All other materials, to the extent that they arrive at the fluidized bed 2, are removed from such fluidized bed 2 by means of a suitable exhaust air flow regulation, if desired, also the buds or sprouts. This material which has been maintained in a heated condition in the fluidized bed 2 is then delivered by means of a line or conduit 28 and 36 to the crushing or breaking or cracking rolls or roll mill 23 where the material is crushed or fractured and then is further conveyed by a connection line 37 to the flaking device 24 where it is flaked.

The mixture of hulls, buds or sprouts (also known as the germ), and core or seed portions is delivered by means of the lines or conduits 44 to the cyclone device 12 having cell wheel sluices 12' and at that location is separated from the air. Incorporated into this mixture is also a particle mixture which has been separated from the exhaust air of the first fluidized bed 1 at the cyclone devices or cyclones 8 and 10 and delivered to this location by a suitable transport device 15. From a transport device 16 the mixture is delivered by means of a line 29 into a sifter device 17. In the sifter device 17 there is accomplished the separation into a bud fraction or bud portion/coarser core or seed portion fraction and a hull/fine fraction. The hulls and fines, after accomplishing a further cyclone separation at the cyclone apparatus 18, are separated from one another at a single-tier sieve 21 which contains a 1 mm sieve or filter and the valuable oil protein-containing meal is again infed, prior to extraction, to the primary product stream by means of the line or conduit 32. The thus formed quantity of meal amounts to approximately 1% of the installation throughput. The bud portion/coarser seed portion fraction, which has been obtained at the sifter unit 17 is delivered via the line 33 into the main or primary product stream coming from the line 28 and then conjointly conveyed by means of the common line or conduit 36 to the roll bed or mill 23 where the breaking or crushing operation is accomplished.

It is possible and has been schematically shown in phantom lines in FIG. 3 of the drawings, to separate at a single-tier sieve 22 the bud portion/coarser seed portion fraction obtained at the sifting device 17. Here, the coarser seed portion is infed by means of a line 34 into the line or conduit 36 and the separated bud portion is eliminated from the processing system by means of a line or conduit 35.

The hull-free half cores or seeds which arrive by means of the sifter channel 6 at the second fluidized bed 2 are placed in a fluidized state at that location. By virtue of the mutual friction or rubbing action between the particles any possibly still adhering shells or hulls are detached and eliminated along with the exhaust air. In this fluidized bed 2 there is also regulated the product end temperature and at the same time there can be adjusted in conjunction with the regulation of the first stage reductions in the moisture content between 1 and 2%.

The quantity of air needed for the fluidization of the fluidized beds 1 and 2 is essentially conveyed in a closed cycle, and specifically, through the lines or conduits 42, 43, 46 and 40. In the lines 42 and 43 there are arranged the centrifugal fans 11 and 13, respectively. Only the quantity of air needed for removal of the moisture withdrawn from the material, i.e. the water which has been removed from the processed material, is infed to the system in the form of fresh or make-up air by means of the lines or conduits 47 and 48 and withdrawn as exhaust or waste air by means of the lines or conduits 41 and 24. As shown in FIG. 3, in the lines 24 and 41 there are arranged the centrifugal fans 19 and 9, respectively, and in the line 47, the centrifugal fan 20. By virtue of the low quantity of exhaust air there is obtained a minimum pollution of the environment and there is ensured for as low as possible energy consumption and an optimum utilization of the energy.

The heating of the air is accomplished in the depicted embodiments of installations by direct combustion of gaseous or liquid fuels.

Apart from such heating of the air as proposed above, there is also available the possibility of not heating the air and introducing the air needed for heating-up the material by means of a heat exchanger-fluidized bed 1 into the first drying zone. Hence, in this case heat exchanger tubes or the like which are heated with steam, heating oil or the like, are located in the fluidized bed. Because heat is extracted from the product in the second fluidized bed 2 and such heat is used to heat-up the make-up air from line or conduit 47, there is advantageously realized a savings in energy of approximately 25% for the system.

As described, the material effluxes out of the fluidized bed 2, as does also the material from the sieve 17 or after the single-tier sieve 22, in a heated condition through the lines 33 and 34, respectively, and is infed to the commercially available double-stage roll beds or mill arrangement 23 in order to be crushed or fractured at that location while in a heated condition. This hot crushing, in contrast to the conventional cold crushing or breaking operation, produces rather an increase in the throughput and lowers the specific energy costs. In each instance, there is to be expected an appreciable improvement in the equipment wear when processing hull or hull-free soft beans or seeds, and thus, an appreciably longer service life of the rolls. The thus obtained fraction corresponds, with the exception of the fine proportion, in the sieve analysis, to the cold fractured or crushed beans and is equally good for undergoing flaking. The fine proportion, in the case of the beans being fractured or crushed in a cold state, amounts to a total of approximately 5% which in the case of hot crushed half beans only amounts to approximately 1%, that is, together with the fine proportion of 1% from the preparation or processing of the mixture from the exhaust air amounts to a total of only 2%.

The inventive method, in contrast to the conventional method discussed previously in conjunction with the prior art equipment schematically shown in FIG. 1, constitutes a simplification and reduction in the number of process stages or steps by combining individual stages or steps and eliminating other equipment. First of all, with the inventive method there is eliminated the tempering stage and thus the tempering silo 52 of the prior art arrangement of FIG. 1. Additionally, the material is only heated-up once and not intermittently cooled. The method of the invention is carried out continuously. The separation devices for processing the mixture which is withdrawn along with the exhaust air are designed to only handle 15% instead of 100% of the installation throughput, as is the case with the prior art method. The fine proportion in the material which is to be extracted amounts to only maximum 50% in relation to the present day prior art method. This possibly affords an improvement in the operation conditions, for instance during the extraction there can be accomplished an improved perculation which, on the one hand, leads to a higher possible throughput of product through the installation and, on the other hand, to an improved drainage of the meal. Also, there is simplified the purification of the oil from its meal particles. The air quantities for the most part are recirculated and only small quantities of exhaust air are exhausted into the surroundings or environment. The quantity of exhaust air which is expelled into the environment when practicing the prior art method, by virtue of the drying and cooling occurring in the shaft drier 50 and cooler 51, respectively, and due to the hull or shell separation, is more than twice as great.

Additionally, the air contains a larger quantity of dust since the quantity of fines at the raw gas side exceeds 5% in contrast to 1% with the inventive method of processing the product throughput in the installation. The higher dust content of the raw gas side, with the same manner of dedusting, automatically is associated with a higher dust content at the clean gas side. The total emission of the prior art installation is therefore a multiple of that experienced with the installation operation according to the invention, even when assuming that there is accomplished, by virtue of the higher loading of the cyclones, twice the degree of dedusting, and, in fact, amounts to five-fold more emission than experienced with the inventive method. Also, there can be dispensed with the heretofore required conditioning device 63. With the inventive method the removal of the moisture content can be regulated so as to amount to a minimum between 1% and 2%. With the conventional method a humidity or moisture content regulation is only possible within very narrow limits and automatically is in the order of at least 2%. Hence, the inventive method is appreciably more versatile. The drying in the fluidized bed is essentially more economical and leads to an appreciably more uniform heating-up of the materials and therefore a more uniform product. The degree of deshelling or dehulling realized with the inventive method is at least as good as that with the prior art technique. With the inventive method there also is experienced a lower good product loss at the hull or shell side of the system. With the inventive method there can be separated the buds or sprouts and possibly again used in the process or eliminated from the process. By virtue of the processing or treating of the material while in a heated condition there also is beneficially realized a prolonged service life of the corrugated roll bed or mill. Finally, by way of completeness, it is indicated that in the prior art arrangement of FIG. 1, the elements 56 and 58 represent cyclones, the elements 55 and 57 double tier sieves or screens, and the elements 59, 60, 61 and 62 sifters.

It is here mentioned that the corrugated roll mill or bed 3 could also be constructed as a double- or two-stage corrugated roll mill. In such case, the corrugated roll mill or roll mill 23 could be eliminated with an attendant beneficial saving in equipment and energy, although with this modification, a somewhat greater amount of fines will be produced in the corrugated roll mill 3 and aspirated.

Regardless of whether the corrugated roll mill 3 is constructed as a single-stage or double- or two-stage roll mill, the drive ratio of at least each coacting pair of rolls or rollers is approximately 1:2 in order to obtain the desired shearing action on the soybeans. It is also to be noted that for a standard U.S. No. 2 soybean, the corrugations on the top pair of rolls of a two-stage roll mill 3 amounted to approximately 3 per inch of roll circumference based on a 10 inch diameter roll, whereas on the lower pair of rolls the corrugations amounted to approximately 5 per inch of roll circumference based on a 10 inch diameter roll. In case of a single-stage corrugated roll mill and for the same type of U.S. soybean, the corrugations amounted to approximately 4 per inch of roll circumference based on a 10 inch diameter roll.

While there are shown and described present preferred embodiments of the invention, it is to be distinctly understood that the invention is not limited thereto, but may be otherwise variously embodied and practiced within the scope of the following claims. ACCORDINGLY,

What we claimed is:

1. An apparatus for the continuous preparatory treatment of soybeans in order to recover soybean oil and soybean meal, comprising:

a fluidized bed for applying to the soybeans composed of hulls and seeds contained in such hulls a substantially homogeneous heat treatment for a relatively brief amount of time insufficient for substantial heat diffusion to the seeds, so as to essentially apply heat only to the hulls and the outer surface of the seeds, in order to render the hulls brittle and to cause them to loosen from the seeds;

a corrugated roll mill arranged after said fluidized bed;

means for feeding the substantially homogeneously heat treated soybeans from the fluidized bed to said corrugated roll mill without any intermediate cooling thereof;

said corrugated roll mill subjecting the substantially homogeneously heat treated soybeans while in a heated condition to forces in order to split the soybeans, so that there are substantially formed split seeds and split hulls;

a separate impacting device arranged after the corrugated roll mill; and means for delivering soybeans from said corrugated roll mill without any intermediate cooling to said separate impacting device where the split soybeans composed of the split seeds and split hulls are subjected to an impacting action in order to separate a predominant part of the split hulls from their related split seeds.

2. The apparatus as defined in claim 1, further including:

an air throughflow device arranged following the separate impacting device;

means for feeding the separated hulls and seeds from said separate impacting device towards said air throughflow device;

means for employing air of the air throughflow device as aspiration air for the elimination of the hulls from the seeds prior to entry of the seeds into the air throughflow device; and means for infeeding the seeds to the air throughflow device for maintaining the seeds therein in a heated condition.

3. The apparatus as defined in claim 2, wherein:

said air throughflow device comprises a fluidized bed.

4. The apparatus as defined in claim 3, wherein:

said means for infeeding the seeds to the air throughflow device feeds the seeds thereto in a direction opposite to exhaustion of air from the air throughflow device and which exhausted air is employed as said aspiration air.

5. The apparatus as defined in claim 4, further including:

exhaust air pipes structured as sifters for accomplishing separation of the hulls from the seeds.

6. The apparatus as defined in claim 1, further including:

an air throughflow device arranged following the separate impacting device;

means for feeding the separated hulls and seeds towards said air throughflow device;

means for eliminating the hulls from the seeds prior to entry of the seeds into said air throughflow device; and means for infeeding the seeds to said air throughflow device for maintaining the seeds therein in a heated condition.

7. The apparatus as defined in claim 1, wherein:

said separate impacting device comprises a hammer-type mill which subjects said split soybeans to said impacting action.

8. The apparatus as defined in claim 1, wherein:

said fluidized bed comprises a heat exchanger-fluidized bed.

9. The apparatus as defined in claim 1, wherein:

said fluidized bed has a floor portion which is slightly inclined between opposed ends of said fluidized bed.

10. The apparatus as defined in claim 9, wherein:

said floor portion possesses a maximum inclination of approximately 3% with respect to the horizontal.

11. The apparatus as defined in claim 9, wherein:

one of said opposed ends of said fluidized bed defines an outfeed end; and removal means provided for said outfeed end of said fluidized bed for the removal of undesired particles contained in the soybeans.

12. The apparatus as defined in claim 11, wherein:

said removal means comprises worm means.

13. The apparatus as defined in claim 1, wherein:

said corrugated roll mill is a single-stage corrugated roll mill.

14. The apparatus as defined in claim 1, wherein:

said corrugated roll mill is a double-stage corrugated roll mill.

15. An apparatus for the continuous preparatory treatment of soybeans in order to recover soybean oil and soybean meal, comprising:

a fluidized bed for applying to the soybeans composed of hulls and seeds contained in such hulls a substantially homogeneous heat treatment, in order to render the hulls brittle and to cause them to detach from the seeds;

a corrugated roll mill arranged after said fluidized bed;

means for feeding the substantially homogeneously heat treated soybeans from the fluidized bed to said corrugated roll mill without any intermediate cooling thereof;

said corrugated roll mill subjecting the substantially homogeneously heat treated soybeans while in a heated condition to shearing forces in order to split the soybeans, so that there are substantially formed split seeds and split hulls;

an impacting device arranged after the corrugated roll mill; and means for delivering the split soybeans from said corrugated roll mill without any intermediate cooling to said impacting device where the split soybeans composed of the split seeds and split hulls are subjected to an impacting action in order to separate a predominant part of the split hulls from their related split seeds.

16. The apparatus as defined in claim 15, wherein:

said fluidized bed comprises a single-stage fluidized bed.

* * * * *

UNITED STATES PATENT AND TRADEMARK OFFICE
CERTIFICATE OF CORRECTION

PATENT NO. : 4,681,029

DATED : July 21, 1987

INVENTOR(S) : BARTESCH et al

It is certified that error appears in the above-identified patent and that said Letters Patent is hereby corrected as shown below:

Title page:

In the Abstract, line 4, please delete "honogeneous" and insert --homogeneous--

In the Abstract, line 6, please delete "fludized" and insert --fluidized--

Column 8, line 68, please delete "claimed" and insert --claim--

Signed and Sealed this

Fifth Day of April, 1988

Attest:

DONALD J. QUIGG

*Attesting Officer*

*Commissioner of Patents and Trademarks*